(12) United States Patent
Maldonado

(10) Patent No.: US 6,489,739 B2
(45) Date of Patent: Dec. 3, 2002

(54) VEHICLE WINDOW ACTUATION ASSEMBLY

(76) Inventor: Fausto Maldonado, 615 SW. 82 Ave., Miami, FL (US) 33144

( * ) Notice: Subject to any disclaimer, the term of this patent is extended or adjusted under 35 U.S.C. 154(b) by 0 days.

(21) Appl. No.: 09/734,869

(22) Filed: Dec. 13, 2000

(65) Prior Publication Data

US 2002/0070697 A1 Jun. 13, 2002

(51) Int. Cl.$^7$ .................................................. G05B 5/00
(52) U.S. Cl. ....................... 318/445; 318/264; 318/265; 318/280; 318/281; 318/483
(58) Field of Search ................................. 318/264, 265, 318/280, 281, 483, 445

(56) References Cited

U.S. PATENT DOCUMENTS

| | | |
|---|---|---|
| 5,245,217 A | 9/1993 | Honma |
| 5,333,703 A | 8/1994 | James et al. |
| 5,421,460 A | 6/1995 | Bosshard |
| 5,459,380 A | 10/1995 | Augustinowicz |
| 5,481,139 A | 1/1996 | Lucas |
| 5,547,208 A * | 8/1996 | Chappell et al. ............ 318/265 |
| 5,806,257 A | 9/1998 | Cornils et al. |
| 6,201,363 B1 * | 3/2001 | Miyazawa ................... 318/283 |
| 6,281,647 B1 * | 8/2001 | Sasaki ........................ 318/264 |

* cited by examiner

*Primary Examiner*—Karen Masih
(74) *Attorney, Agent, or Firm*—Malloy & Malloy, P.A.

(57) ABSTRACT

A window actuation assembly for a vehicle which is structured to automatically lower at least one, but preferably all of the windows of a vehicle in the event that a vehicle becomes partially or totally submerged in a body of water and regardless if the orientation of the vehicle, is up-right, inverted, on its side, etc. One or more fluid sensors are located strategically throughout the various portions of the vehicle and are specifically structured activate a drive assembly for the lowering of the windows upon sensing a predetermined amount of water within an associated proximity of the vehicle, to the extent that the one or more sensors are themselves at least partially submerged. The sensors are further structured not to be activated in the unlikely event that liquid inadvertently is spilled upon or otherwise applied thereto. The one or more sensors may be associated with a single drive assembly and/or independent drive assemblies associated with each of the windows such that only one, or more preferably all of the windows may be lowered in an emergency, submerged condition of the vehicle. The windows may be restricted from being raised into the normally closed position once they have been lowered under emergency circumstances, in order to prevent inadvertent closing of the windows by an occupant of the vehicle suffering from injury or being otherwise disoriented because of the emergency.

13 Claims, 2 Drawing Sheets

VEHICLE WINDOW ACTUATION ASSEMBLY

BACKGROUND OF THE INVENTION

1. Field of the Invention

The present invention relates to a vehicle window actuation assembly which is structured to provide for the immediate and automated lowering of at least one window in a vehicle, such as a car or truck, in circumstances wherein a fluid level either inside or outside of the vehicle is elevated above a certain predefined amount, such as when the vehicle becomes at least partially submerged. Occupants of the vehicle will be prevented it from being trapped inside the vehicle in such emergency circumstances.

2. Description of the Related Art

Although there are many commonly recognized hazards associated with operating a motor vehicle, one hazard that is often overlooked relates to the extreme danger to occupants that exists when a vehicle is inadvertently driven into a body of water of sufficient depth to submerge all or a portion of the vehicle. Specifically, in many areas, such as the tropical areas of southern Florida, it is common to have small lakes and canals located adjacent to roads and streets. While these lakes and canals are typically set back at least a short distance from the roads, it is unfortunately a relatively common occurrence that a motor vehicle, because of being involved in an accident and/or because of carelessness, is driven into the adjacent body of water. For example, in many areas susceptible to flooding, it is not uncommon that water levels will rise to the point where it is still safe to drive, but where the operator of the vehicle may have difficulty in truly distinguishing a portion of the road from the flooded water levels. Under such circumstances, a substantial hazard exists for individuals operating the motor vehicles, losing track of the location of the road and inadvertently driving themselves into a canal or other body of water. During the evening hours operators of motor vehicles are frequently not able to distinguish the demarcation between the actual road and the shoreline of the bodies of water. Furthermore, in situations where an accident may occur, and a canal or other body of water is in relatively close proximity, it is very possible and often likely that any of the vehicles involved in the accident will actually find their way or be forced into the body of water.

Although these bodies of water can often be relative shallow and/or a vehicle may not be completely submerged, it is recognized that such situations can still be substantially hazardous and often deadly to the passenger of the vehicle. Specifically, it is an all to common occurrence that when the vehicle is driven into the body of water, passengers, often somewhat disoriented from the circumstances become trapped within the vehicle and have no means of escape, as the vehicle becomes submerged.

Indeed, to this end, there has been numerous inventions directed towards tools and other devices which allow a passenger, including the driver, to break one or more windows and thereby provide some means for escape. As such, it would be highly beneficial to provide a system which is able to sense or otherwise recognize such hazardous and dangerous circumstances and work to assist the escape of the passengers from the vehicle. Further, such an improved system should be capable of operating before it is to late and the vehicle becomes mostly or totally submerged and the orientation of the vehicle or pressure on the vehicle's window prevents their being opened. Also, such an improved system should be operative in addition to or independently of other systems or components normally associated with the vehicle. Most importantly, the system should be capable of operating in the most extreme emergency circumstances in order to provide an effective and reliable means of escape for the passengers. Further, the system should also be almost instantly operative, such that the passengers have sufficient time to escape and the pressure associated with being submerged does not adversely effect the window so as to hinder and/or prevent their being opened.

It is also recognized that a significant number of vehicles, come equipped with their own power window systems which facilitate the opening and closing of windows under normal circumstances. Unfortunately, however, it is recognized that in some circumstances the passengers may either be substantially disoriented and therefore can not effectively and timely actuate the normal opening means for the windows, especially if they are concerned with other circumstances such as disorientation and/or attending to injuries. Furthermore, it is also recognized that such conventional power window structures may not operate in circumstances where the vehicle has become partially submerged, as the water may result in a malfunctioning of the vehicle's power system.

Additionally, it is also noted that in the art associated with window actuation, there are a number of structures and devices which are directed towards preventing water from entering a vehicle, once it has begun raining. Specifically, such devices detect that rain is entering the vehicle as a result of an open window and thereby cause the open window to be closed, thus preventing the further entry of unwanted water to the interior portions of the vehicle. As it can be appreciated, such devices are indeed structured to accomplish a different function than that set forth above. Also, components associated with this type of "rain detector" would not be capable distinguishing the submerged condition of a vehicle from rain fall or possibly even the movement of a vehicle through a large puddle.

Accordingly, there is still a substantial need in the art for a vehicle window actuation assembly which effectively and safely operates one or more windows of a vehicle, even in situations wherein the vehicle is partially submerged, and is able to detect true emergency circumstances, so as to instigate and facilitate the exiting of passengers particularly in this type of hazardous situation.

SUMMARY OF THE INVENTION

The present invention relates to a vehicle window actuation assembly. The vehicle window actuation assembly is structured for use in a vehicle having at least one window that is structured to be opened and closed. More specifically, the vehicle window actuation assembly includes a drive assembly. The drive assembly is structured to at least lower the window, and under certain predetermined conditions both lower and raise the window. Also, in at least one embodiment of the present invention, raising of the window, once automatically lowered in an emergency situation, is restricted.

Additionally, a fluid sensor assembly is provided. Specifically, the fluid sensor assembly is structured to monitor an amount of fluid that is disposed within a defined proximity of the vehicle. Moreover, the fluid sensor assembly is structured to direct the drive assembly to lower the window when the amount of fluid detected by the fluid sensor assembly exceeds a predetermined amount or reaches a predefined level. Accordingly, when the vehicle becomes partially and/or completely submerged, the fluid sensor assembly detects the rise or location of the water levels and/or the amount of water above the predefined amount and initiates the lowering of at least one window of the vehicle. The facilitated escape of the passengers of the vehicle is thereby accomplished.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
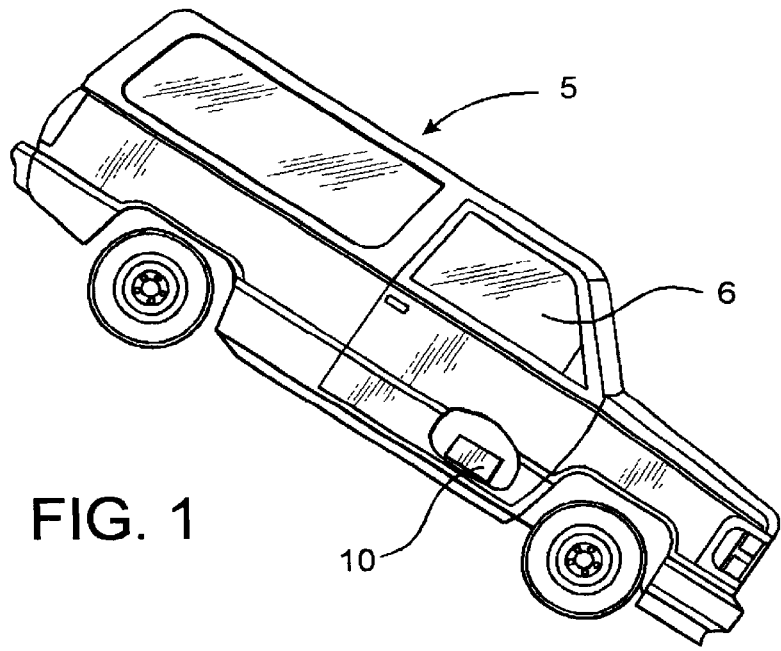
FIG. 1 is a perspective illustration of the vehicle window actuation assembly of the present invention operatively disposed on a vehicle.

The present invention is directed towards a vehicle window actuation assembly, generally indicated as 10. In particular, the vehicle window actuation assembly 10 is structured for use in a vehicle, typically a motor vehicle of the type that includes at least one window 6 that is structured to be opened and closed. Specifically, the present vehicle window actuation assembly is structured for use in a situation wherein the vehicle 5 becomes completely and/or partially submerged and as a result opening of at least one window 6 is critical to provide for the safe escape of passengers trapped within the vehicle 5. Additionally, as indicated in FIG. 1, the vehicle window actuation 10 of the present invention may be entirely and/or partially disposed at various locations throughout the vehicle 5. However, it may be preferred that all or at least a portion thereof be disposed in general proximity to a door and/or the primary window 6 of the vehicle 5 to provide for a more accurate indication of water levels at or near the window 6. More convenient and effective access to the operating controls required for the movement of the window 6 is thereby also facilitated and provided.

Looking specifically to the window actuation assembly 10 of the present invention, it includes a drive assembly, generally indicated as 20. The drive assembly 20 is structured to at least lower the window, and in certain specified circumstances may also either allow or restrict raising of the window, once it has been lowered by the actuation assembly 10, under emergency conditions. For example, raising of the window may be accomplished as part of the operation of a normal power window system associated with many modern motor vehicles.

Moreover, it is recognized that although a single drive assembly 20 may be provided, a pair or more of drive assemblies 20 may be provided, each in operative association with a different window or pair of windows. Of course, vehicles having more than two windows which can be opened and closed, may require an additional, appropriate number of drive assemblies and additional associated components of the present invention may also be equivalently incorporated.

Figure 2:
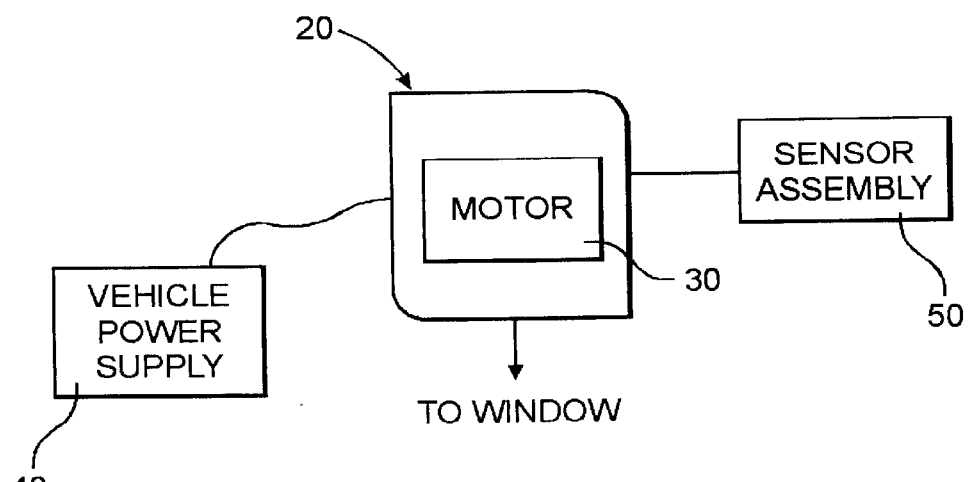
FIG. 2 is a schematic illustration of one embodiment of the vehicle window actuation assembly operating in conjunction with the vehicle power source incorporating an existing power window motor.
Figure 3:
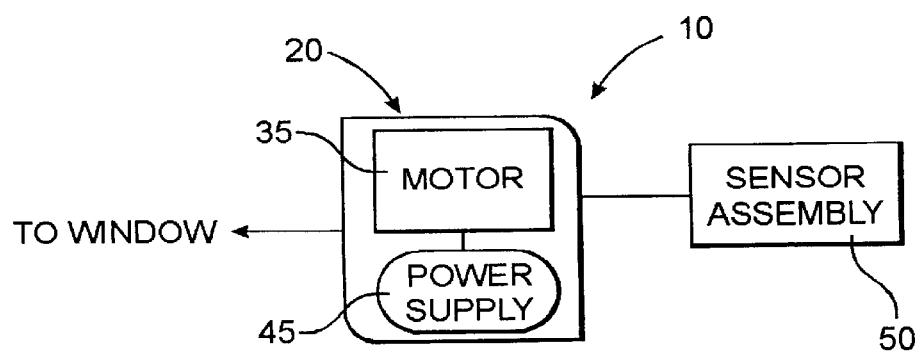
FIG. 3 is a schematic representation of another embodiment of the vehicle window actuation assembly of the present invention including a self contained power supply and motor for an independent operation.

Looking specifically to the embodiments of FIGS. 2 and 3, it is recognized that the drive assembly 20 may include a drive motor 30 normally used to operate the window of the vehicle and/or a separate motor 35. Specifically, many modern vehicles include power windows and as a result, are associated with a motor which moves the window up and down within the contents of the present invention. As such, the drive assembly 20 of the present invention may be structured to integrate and/or be connected with the power window motor 30 of the vehicle 5. In the embodiment of FIG. 3, however, it may alternately be preferable to add an independent motor 35, as either a back-up or as the primary means of driving the window 6 down in the emergency situations of the type described herein. This latter embodiment overcomes any potential malfunction that may be associated with the vehicles own operating systems and in particular the power window motor of the vehicle, particularly in the extreme emergency situation where the vehicle is partially or completely submerged.

Figure 4:
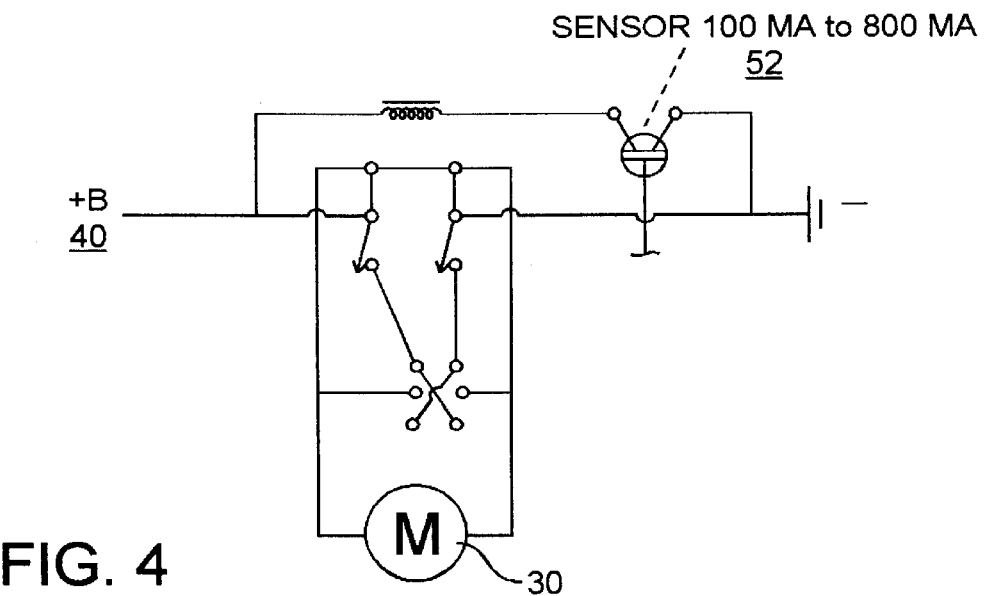
FIG. 4 is a circuitry diagram illustrating one embodiment of the circuitry associated with the present invention.
Figure 5:
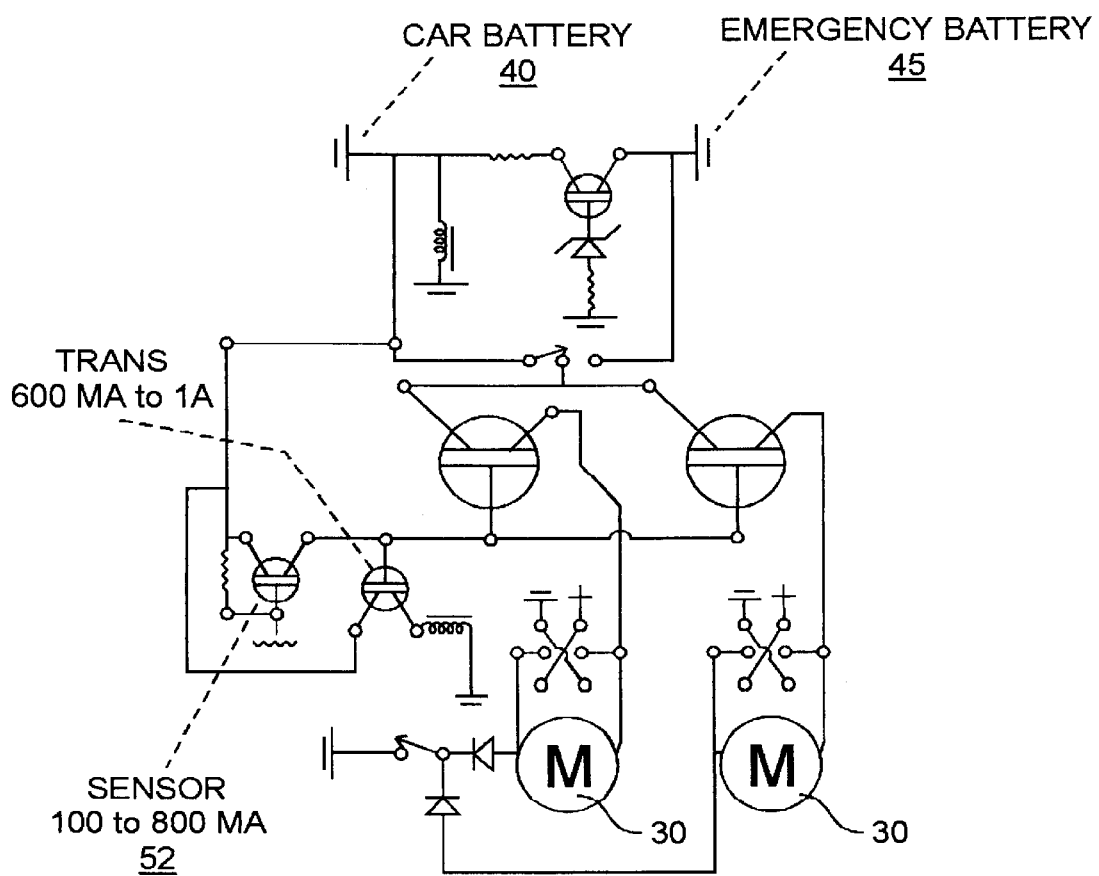
FIG. 5 is a circuitry diagram illustrating another embodiment of circuitry associated with the present invention, in particular illustrating integration of the present invention with both vehicle windows.

In order to effectively operate the motor 30 or 35 of the drive assembly 20, a power source 40 and 45 respectively is preferably provided. In the embodiment of FIGS. 2 and 4, the power source that operates as part of and/or an association with the drive assembly 20 may include the vehicle power supply 40. Specifically, the car battery and/or other vehicle power supply 40 that normally operates power window motor 30 of the vehicle 5 may be utilized, and as illustrated in FIGS. 4 and 5 may be integrated within the circuitry of the present invention such that power required for lowering window may be drawn therefrom. Alternatively, however, and/or in addition to the utilization of the vehicle power supply 40, as illustrated in FIGS. 3 and 5, the present vehicle window actuation assembly 10 may also include a power source 45 separate and generally distinct from the vehicle supply 40. Specifically, independent power source 45 can act as a back-up and the primary source of power for the present vehicle window actuation assembly 10, such that the window 6 of the vehicle 5 can be lowered regardless of a status of the vehicle power source 40. Of course, the preferred independent power source 45 may be structured and disposed to be the first or primary power source looked to by the present invention and/or may be provided merely as a back-up, such that if a vehicle power supply 40 is not available, the independent power source is available to operate the motor of the drive assembly 20.

Further provided as part of the vehicle window actuation assembly 10 of the present invention is a fluid sensor assembly, generally indicated as 50. The fluid sensor assembly 50 is structured to monitor an amount of fluid that is disposed within a defined proximity of the vehicle. Preferably, an amount of fluid includes a fluid level and the defined proximity of the vehicle 5 includes the proximity which surrounds the vehicle 5 and accordingly which the vehicle 5 is disposed within. In the preferred, illustrated embodiment, the fluid sensor assembly 50 includes a water conductive switch 52. Specifically, the water conductive switch 52 is structured to complete a circuit, when it is preferably completely submerged in a fluid, such as water. As such, conductive switch 52 is generally configured such that it will not result in the lowering of the window merely when it becomes wet, but rather only when it is completely or at least partially submerged. In particular, the fluid sensor assembly 50 of the present invention is structured to direct the drive assembly 20 to lower the window 6 of the vehicle 5 upon the pre-set level or amount of fluid detected. Although a variety of predefined amounts may be set in accordance with the needs of the users and/or installers or operators of the present system, preferably the predefined amount includes a fluid level that is sufficient to at least partially submerge the vehicle. Additionally, that fluid level is preferably sufficiently high that when the vehicle is driving through a puddle and/or is otherwise in a safe circumstance that is not indicative of a partial and/or complete submerging of the vehicle, the activation assembly 10 will not result in the automatic lowering of the windows, which may be undesirable to the passenger. Accordingly if, and when one or more fluid sensor assemblies 10 detect that the fluid levels have risen to the point of danger, whereby the evacuation of the passenger may indeed be required, it would effectively complete the circuit or otherwise activate the associated circuitry. The drive assembly 20 in the illustrated embodiments directs the associated motor 30 or 35, included as a part thereof, to lower the window 6 allowing the escape of passenger.

Looking further to the fluid sensor assembly 50, it is preferably structured to detect the fluid level relative to a plane or underlying surface. More particularly, the fluid sensor assembly 50 will preferably maintain a generally vertical sensing plane. As such, even if the vehicle is disposed up-side down, on its side and/or in a partially vertical orientation, the fluid sensor assembly 50 will still be able to identify an appropriate rise of a fluid level to the point where a hazardous condition is indicated. Moreover, as previously described it is also preferred that one or more of the fluid sensor assemblies 50 be provided, such as on opposite sides of the vehicle 5, so as to effectively provide fluid level sensing as quickly and as effectively as possible, regardless of the orientation of the vehicle as it is being submerged in the fluid.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. For use in a vehicle having at least one window structured to be opened and closed, a vehicle window actuation assembly comprising:
   a) at least one drive assembly structured to lower at least the one window when power is supplied to said drive assembly,
   b) a fluid sensor assembly structured to monitor an amount of fluid within a defined proximity of the vehicle,
   c) a power supply comprising the main power supply of the vehicle being interconnected to said drive assembly by said fluid sensor assembly,
   d) said fluid sensor assembly structured to automatically activate said drive assembly to lower the one window independent of direct manual activation of said fluid sensor assembly, and
   e) said fluid sensor assembly comprising a switch assembly structured and disposed to operatively connect said power supply to said drive assembly to lower the window upon said amount of fluid detected by said fluid sensor assembly being disposed above a pre-defined amount.

2. A vehicle window actuation assembly as recited in claim 1 wherein said fluid sensor assembly is structured to detect a fluid level as said pre-defined amount sufficient to at least partially submerge the vehicle.

3. A vehicle window actuation assembly as recited in claim 1 wherein said fluid sensor assembly is structured to detect a fluid level as said pre-defined amount sufficient to submerge said switch assembly.

4. A vehicle window actuation assembly as recited in claim 2 wherein said fluid sensor assembly is structured to detect said fluid level relative to a plane of an underlying surface.

5. A vehicle window actuation assembly as recited in claim 4 wherein said fluid sensor assembly is structured to maintain a generally vertical sensing plane.

6. A vehicle window actuation assembly as recited in claim 1 wherein said fluid sensor assembly includes a plurality of fluid sensors disposed at opposite sides of the vehicle.

7. A vehicle window actuation assembly as recited in claim 6 including each of said fluid sensors associated with a different drive assembly, each drive assembly structured to operate a different one of a plurality of windows of the vehicle.

8. A vehicle window actuation assembly as recited in claim 7 wherein each of said fluid sensors are structured to operate corresponding one of said drive assemblies independently of one another.

9. A vehicle window actuation assembly as recited in claim 7 wherein each of said fluid sensors are structured to direct both of said drive assemblies to lower the windows upon either of said sensors detecting that said amount of fluid is above said pre-defined amount.

10. A vehicle window actuation assembly as recited in claim 3 wherein said drive assembly includes a power window motor of the vehicle.

11. A vehicle window actuation assembly as recited in claim 3 wherein said switch assembly includes a water conductive switch structured to be actuated upon being submersed in the fluid.

12. A vehicle window actuation assembly as recited in claim 3 wherein said fluid sensor assembly and said drive assembly are cooperatively structured to restrict raising of the window once a predetermined amount of fluid has been detected by said sensor assembly.

13. For use in a vehicle having at least one window structured to be opened and closed, a vehicle window actuation assembly comprising:
   a) at least one drive assembly structured to lower at least the one window when power is supply to said drive assembly,
   b) a fluid sensor assembly structured to monitor an amount of fluid within a defined proximity of the vehicle,
   c) a power supply comprising the main power supply of the vehicle being interconnected to said drive assembly by said fluid sensor assembly, d) said fluid sensor assembly structured to automatically activate said drive assembly to lower the one window independent of direct manual activation of said fluid sensor, e) said fluid sensor assembly comprising a water conductive switch assembly structured and disposed to operatively connect said power supply to said drive assembly to lower the window upon said amount of fluid detected by said fluid sensor assembly being disposed above a pre-defined amount, and f) said fluid sensor assembly and said drive assembly being cooperatively structured to restrict rasing of the window once a predetermined amount of fluid has been detected by said sensor assembly.

* * * * *